(12) United States Patent
Wheeler et al.

(10) Patent No.: US 8,713,032 B2
(45) Date of Patent: Apr. 29, 2014

(54) CROSS-PLATFORM CLOUD-BASED MAP CREATION

(75) Inventors: Mark Damon Wheeler, Monte Sereno, CA (US); Eli Dylan Lorimer, San Francisco, CA (US); David Kramer, Santa Barbara, CA (US)

(73) Assignee: Google Inc., Mountain View, CA (US)

( * ) Notice: Subject to any disclaimer, the term of this patent is extended or adjusted under 35 U.S.C. 154(b) by 126 days.

(21) Appl. No.: 13/310,317

(22) Filed: Dec. 2, 2011

(65) Prior Publication Data

US 2012/0215817 A1  Aug. 23, 2012

Related U.S. Application Data

(60) Provisional application No. 61/445,861, filed on Feb. 23, 2011.

(51) Int. Cl.
*G06F 17/30* (2006.01)

(52) U.S. Cl.
USPC .......................................... 707/756; 707/821

(58) Field of Classification Search
USPC ................. 707/724, 726, 756, 821; 382/113
See application file for complete search history.

(56) References Cited

U.S. PATENT DOCUMENTS

| | | | | |
|---|---|---|---|---|
| 7,827,214 | B1* | 11/2010 | Ghemawat et al. | 707/822 |
| 8,417,938 | B1* | 4/2013 | Considine et al. | 713/151 |
| 2004/0205248 | A1* | 10/2004 | Little et al. | 709/246 |
| 2005/0202877 | A1* | 9/2005 | Uhlir et al. | 463/43 |
| 2006/0248506 | A1* | 11/2006 | Luo et al. | 717/104 |
| 2007/0220035 | A1* | 9/2007 | Misovski | 707/102 |
| 2008/0016472 | A1* | 1/2008 | Rohlf et al. | 715/848 |
| 2009/0185741 | A1* | 7/2009 | Nahari et al. | 382/154 |
| 2009/0254611 | A1* | 10/2009 | Pena et al. | 709/203 |
| 2011/0191023 | A1* | 8/2011 | Engstrom | 701/208 |

* cited by examiner

*Primary Examiner* — Hanh Thai
(74) *Attorney, Agent, or Firm* — Dority & Manning, P.A.

(57) ABSTRACT

Methods, systems and articles of manufacture for cross-platform cloud based map creation are described herein. A method embodiment includes receiving one or more GIS datasets in their respective source formats, each GIS dataset comprising one or more map assets, translating the GIS datasets into a platform independent format, and providing the translated GIS datasets and their respective map assets in the platform independent format to one or more client platforms. The embodiment further includes identifying missing map assets and metadata that comprise a GIS dataset, tracking map assets that comprise a single translated GIS dataset to maintain the translated GIS dataset as a single entity, and providing the translated GIS datasets to a serving system.

31 Claims, 13 Drawing Sheets

CROSS-PLATFORM CLOUD-BASED MAP CREATION

CROSS-REFERENCE TO RELATED APPLICATION

This patent application claims the benefit of U.S. Provisional Patent Application No. 61/445,861, filed Feb. 23, 2011, entitled "Cross-Platform Cloud-Based Map Creation," which is incorporated herein by reference in its entirety.

FIELD

Embodiments generally relate to creation and dissemination of geographically-linked information.

BACKGROUND

Geographically-linked information, such as information included in geographic information system (GIS) datasets, often comes from different sources and is maintained in different native formats. These native formats are tied to their respective GIS software which is needed to view and perform operations on the geographically-linked information. Because of the wide range of these formats, accessing and combining the data is complicated and time consuming. Furthermore, as the amount of geographically-linked information in different GIS formats increases, it becomes increasingly difficult to disseminate such information to users.

BRIEF SUMMARY

Embodiments relate to cross-platform cloud-based map creation. A method embodiment includes receiving one or more GIS datasets in their respective source formats, each GIS dataset comprising one or more map assets, translating the GIS datasets into a platform independent format, and providing the translated GIS datasets and their respective map assets in the platform independent format to one or more client platforms.

A system embodiment includes a first module configured to receive one or more GIS datasets in their respective source formats, each GIS dataset comprising one or more map assets, a second module configured to translate said GIS datasets into a platform independent format and a third module configured to provide said translated GIS datasets and their respective map assets in said platform independent format to one or more client platforms.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
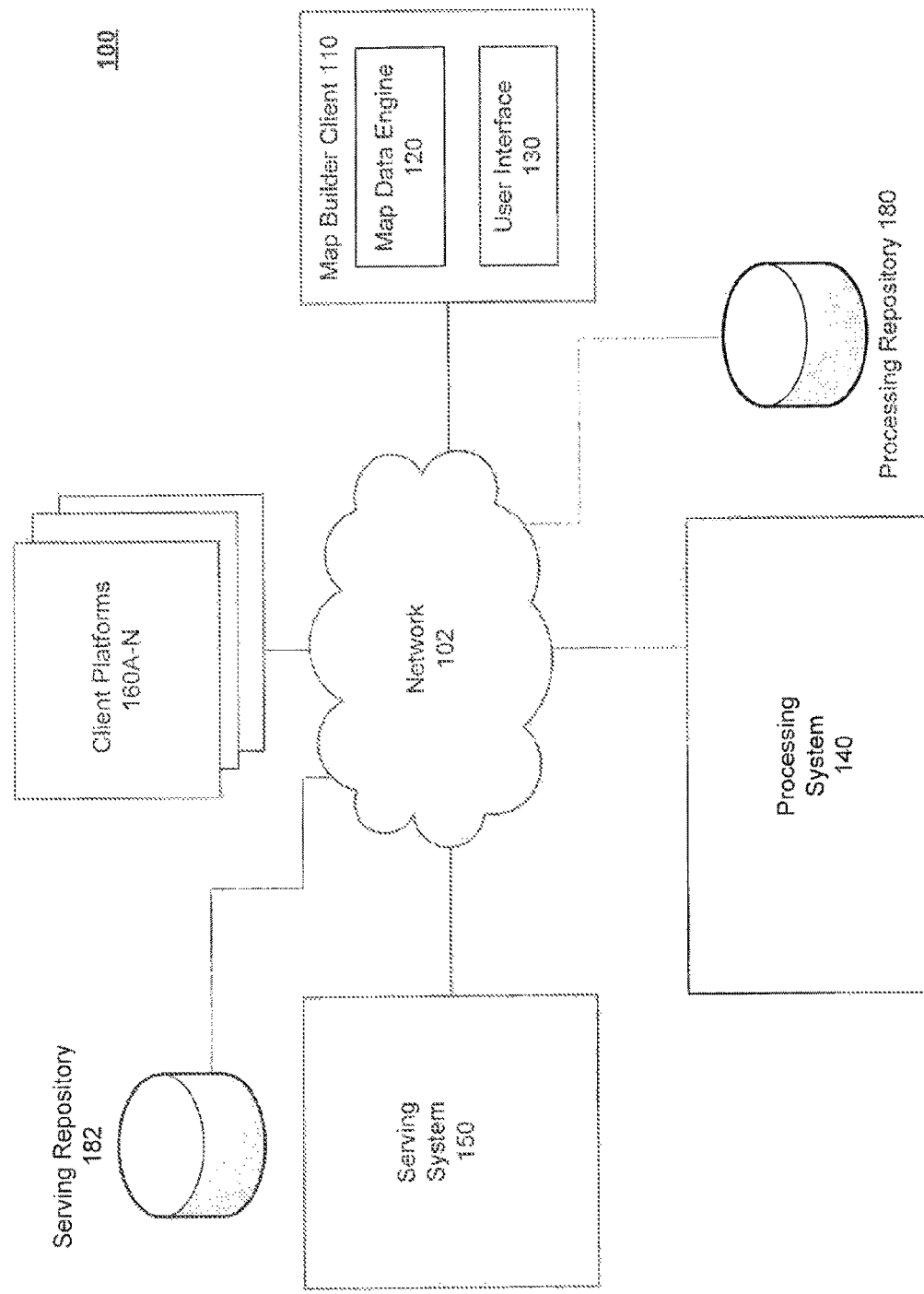
FIG. 1 is block diagram of a system for cross-platform cloud-based map creation, according to an embodiment.

Embodiments relate to cross-platform cloud based map creation. In a non-limiting embodiment, one or more map builders (e.g., cartographers) may access a system for cross-platform cloud-based map creation. Each map builder accessing the system may upload one or more GIS datasets using a map builder client. Each GIS dataset uploaded by a map builder may include one or more files, and each GIS dataset may have a underlying source format. Source formats for GIS datasets may include, for example and without limitation, GIS raster formats, vector formats, and grid formats. As an example, each source format may be dependent upon a specific computer platform, and may require certain computer hardware and/or software to access and manipulate the formatted information.

In an embodiment, GIS datasets uploaded by map builders in their respective source formats may be translated by the embodiments into a platform independent format.

In an embodiment, the translated GIS datasets map may be provided to one or more users through client platforms (e.g., two dimensional (2D) and three dimensional (3D) map platforms) and instantiated on various computing devices (e.g., laptop, smart-phone, desktop, etc.).

In an embodiment, a map including one or more translated GIS datasets may be created. The map may be published to various client platforms on various computing devices using a serving system.

While the present embodiments are described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the embodiments would be of significant utility.

The term "map" as used herein refers to any digital map, any form of geographically linked information and associated metadata. A map may include 2D and 3D representations as well as embedded imagery, audio, video, applications, widgets, etc. These examples are illustrative and are not intended to limit the embodiments.

The term "feature(s)" as used herein may refer to any geographically-linked features displayed on a map. For example, such features may include, but are not limited to, points of interest, terrain features, region boundaries, man made structures, water bodies, etc. The features may also include any user interface features displayed on a map. These examples are illustrative and are not intended to limit the embodiments.

The term "vector data" as used herein may refer to points, lines, and polygons that are used to define a map. Furthermore, vector data may also include any data or metadata (e.g., population, area, latitude, longitude etc.) that is associated with one or more map regions. These examples are illustrative and are not intended to limit the embodiments.

The term "map builder" as used herein may refer to any user (e.g., cartographer) who creates and/or modifies a map, or any other geographically linked information. A map builder may also define different map visualizations and map user interface elements using, for example, a map builder client.

The term "published map" as used herein refers to any digital map, any form of geographically linked information and associated metadata that is displayed in entirety or in part for viewing. A published map may include 2D and 3D representations as well as embedded imagery, audio, video, applications, widgets, gadgets, etc. These examples are illustrative and are not intended to limit the embodiments.

FIG. 1 is a block diagram of system 100 for cross-platform cloud-based map creation, according to an embodiment. System 100 may include network 102, map builder client 110, processing system 140, processing repository 180, serving system 150, serving repository 182, and a plurality of client platforms 160A-N.

System 100 may enable one or more map builders (or cartographers) to upload geographically-linked or GIS data in various formats, apply access controls to the data, group the data into maps, author and style maps, and build and publish maps in a platform-independent format to end users at client platforms 160A-N. Map builders may be able to define characteristics of a published map, such as the data that may be included in each layer of the map (e.g., user demographic data, terrain data, etc.), visualization styles that may be applied to different layers of the map, and access controls that may be applied to the map and to different layers of map data. In a non-limiting embodiment, access to published maps may be controlled using access control lists.

In an embodiment, users may view geographically-linked information and any associated data through client platforms 160A-N. In an embodiment, each client platform 160A-N may be the same, or a different platform. Such client platforms may be instantiated in a browser or even as standalone software applications. Additionally, client platforms 160A-N may display geographical information in 2D and/or 3D representations.

Network 102 may include one or more networks, including but not limited to, a local area network, medium-area network, and/or wide-area network, such as the Internet. Network 102, for example, may be any form of wired or wireless network that allows map builder client 110, processing system 140, processing repository 180, serving system 150, serving repository 182, and client platforms 160A-N and any additional clients or servers to communicate with each other.

Map builder client 110 may include map data engine 120 and user interface 130. By accessing user interface 130, map builders (or cartographers) may build and publish platform independent maps and any other geographically-linked information. Published maps may be viewed by one or more users using client platforms 160A-N. In an embodiment, map builders may use user interface 130 to build and publish platform-specific maps. User interface 130 may facilitate various functions, including uploading of GIS datasets, processing of GIS datasets, applying map access controls, and editing geographically-linked information or any other data. The operation of user interface 130 is further described in U.S. Patent Application No. 61/445,866, entitled "User Interface For Browsing Heterogeneous Map Data," which is incorporated by reference in its entirety.

User interface 130 may also facilitate editing map access security settings, such as through creating or editing an access control list (ACL). An ACL may define one or more users that may be given access to some or all of geographic information stored and/or published by system 100. A user may be assigned to an ACL having a predefined level of access to view, modify and manipulate map data using client platforms 160A-N. Example levels of ACL access may include (basic viewing rights, intermediate viewing privileges and administrator or moderator access privileges). ACLS are further described in U.S. Patent Application No. 61/445,883, entitled "Object-Based Access Control For Map Data," which is incorporated by reference herein in its entirety.

Processing system 140 may receive one or more GIS datasets in their respective source formats from map builder client 110. Each GIS dataset may comprise one or more map assets or map data files. Processing system 140 translates the GIS datasets into a platform independent format and provides the translated GIS datasets and their respective map assets in the platform independent format to one or more client platforms 160A-N using serving system 150. In a non-limiting embodiment, processing system 140 may also translate the GIS datasets into a platform specific format.

In a non-limiting embodiment, processing system 140 can translate one or more GIS datasets in their respective source formats by encoding the GIS datasets' respective elevation data, map shape layers and co-ordinate system descriptions into a platform independent format that can be parsed and rendered by client platforms 160A-N. As a purely illustrative and non-limiting example, a GIS dataset in a GeoTIFF format and another GIS dataset in a Spatial Data File format may be translated by processing system 140 into one platform independent format that can be parsed and rendered by client platforms 160A-N without requiring a separate GeoTIFF and Spatial Data Format file reader.

Processing system 140 may access information stored on processing repository 180. Processing repository 180 may be a persistent storage device or a device that allows both persistent and transient storage of data. Processing repository 180 may allow processing system 140 to securely store and manage map asset data and associated metadata.

In an embodiment, processing system 140 may also identify information missing from a GIS dataset. For example, a GIS dataset may provide a first layer of data for an end user, however, the user's preferences may dictate additional demographic data that may need to be identified and retrieved from a third party data source to provide a completed map to the user on client platform 160A. Processing system 140 may then identify and retrieve such additional data. In another embodiment, processing system 140 may also identify one or more files that are needed to complete an uploaded but incomplete GIS dataset. If files needed to complete the GIS dataset are found to be missing, processing system 140 may provide an alert to a map builder through user interface 130.

In an embodiment, processing system 140 may sanitize map data to provide data security and to prevent malicious processes from being instantiated at clients 160A-N. For example, sanitizing the received map information in GIS datasets may remove malicious coding and other undesired information which may be harmful to the operation of client platforms 160A-N.

During the course of the map building or map creation process at map builder client 110, certain gadgets (e.g., user interface tools) may be linked by processing system 140 to the maps that are to be displayed at clients 160A-N. Gadgets may be, for example, user interface-based tools that a user may use to access, manipulate and modify existing map data. Am example gadget may be a user interface with various buttons and text entry fields where selections may be made to modify and/or view displayed map content according to user preferences.

In an embodiment, access to gadgets at clients 160A-N may be controlled using ACLs. In a non-limiting embodiment, a map builder may create a gadget using JavaScript (or any other script) using a gadget creation interface (not shown) at map builder client 110. A script that instantiates one or more gadgets at clients 160A-N may be associated with a map using the gadget creation interface. The script may be configured to access metadata associated with the map. The script may be used to link to a gadget to a particular map, which, in turn, provides a user with access options, tools and accessories. In an example, a gadget may take the form of a user interface that encapsulates a displayed map. A user may then use the gadget's interface to perform operations on the map. In another example, a gadget may display weather information for a map region that is being viewed by a user. In this way, when the gadget is instantiated at clients 160A-N, a user may use the gadget to perform operations on the map or to retrieve any specific metadata associated with the map.

Figure 7A:
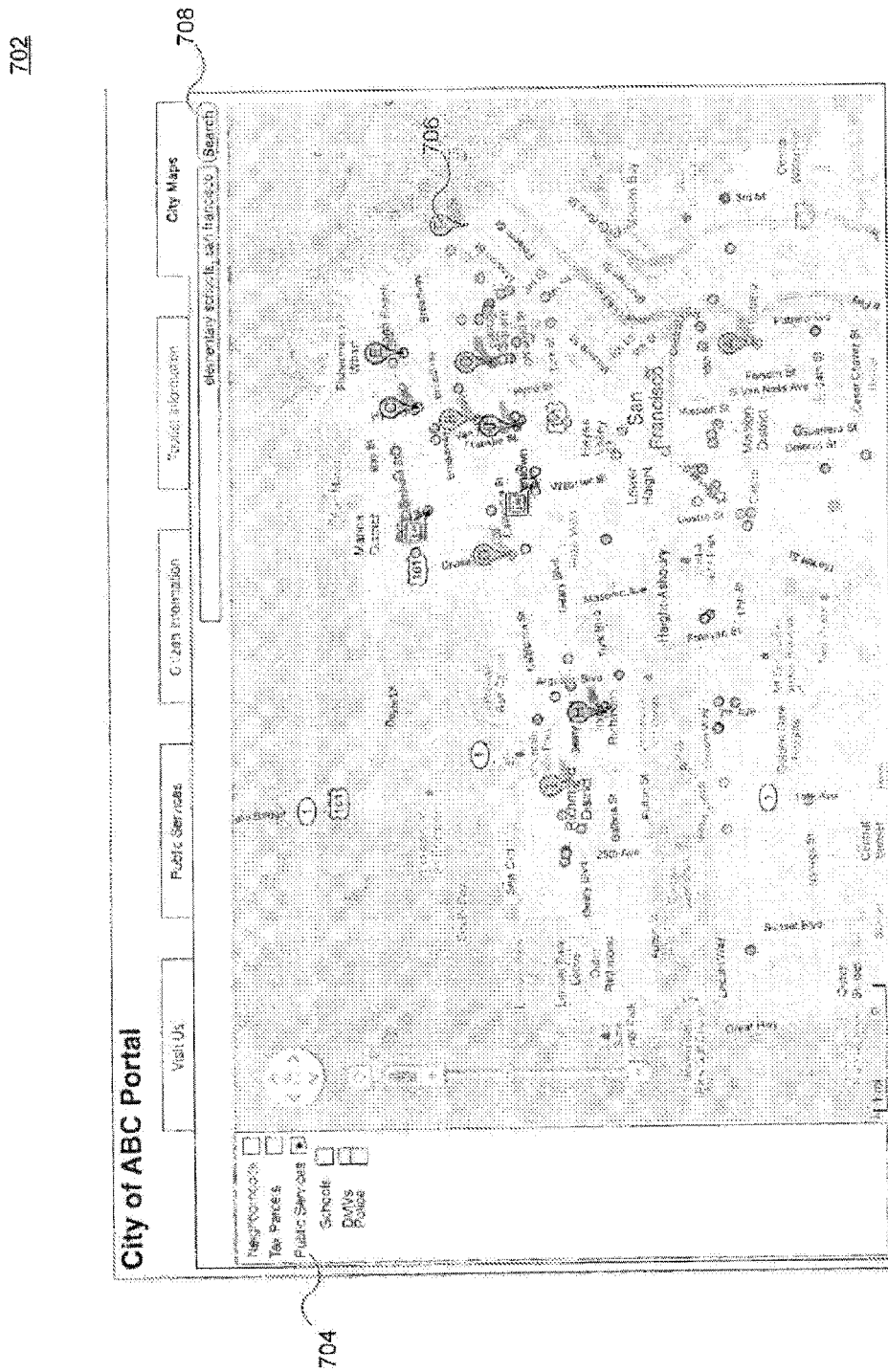
FIGS. 7A-7E are diagrams illustrating exemplary gadgets, according to the embodiments.

FIG. 7A illustrates an exemplary gadget 702 that may be used to display neighborhoods, tax parcels and public services in a city. In this example, gadget 702 is displayed in a browser instantiated on computing device, such as a laptop. As illustrated in FIG. 7A, because the public service checkbox 704 has been selected, public services are displayed as points of interest (e.g., point of interest 706) on the map. Search box 708 also enables searching of any desired information within the map. For example, as shown in FIG. 7A, a user may search for elementary schools in a map region.

Figure 7B:
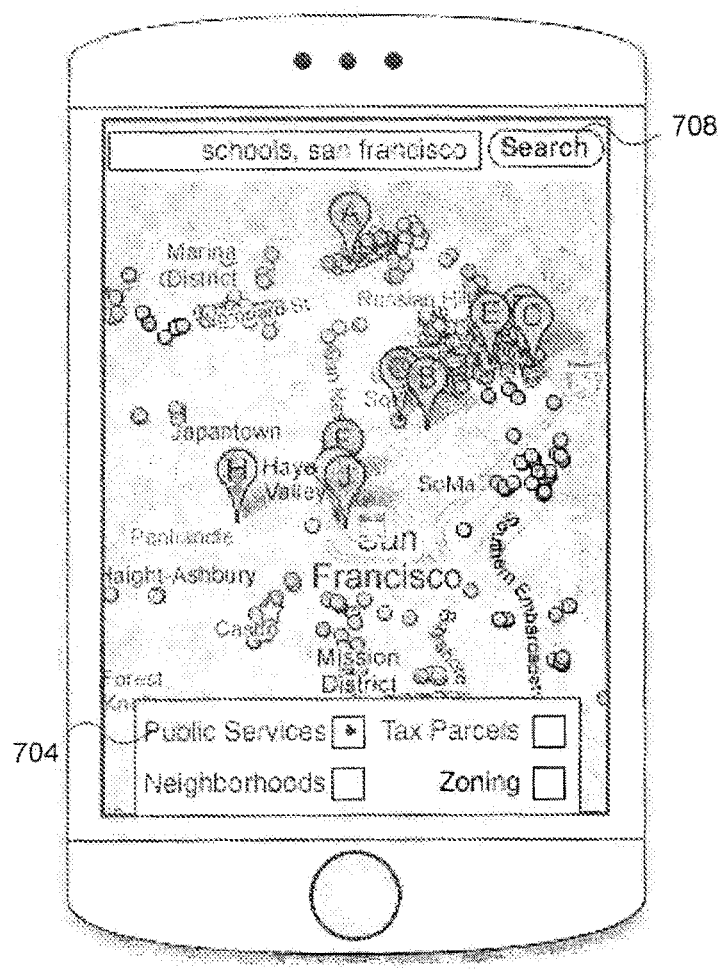
Figure 7C:
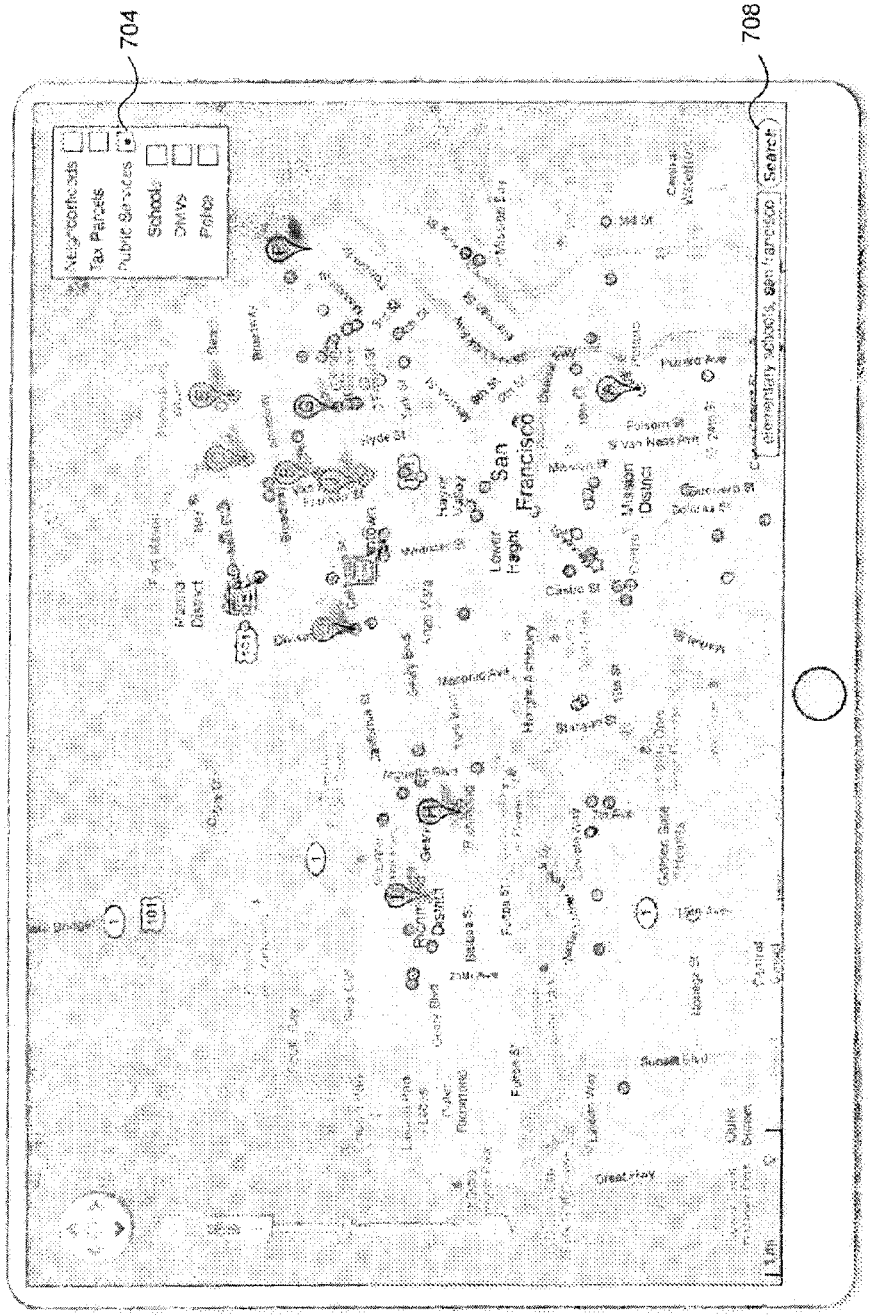
Figure 7D:
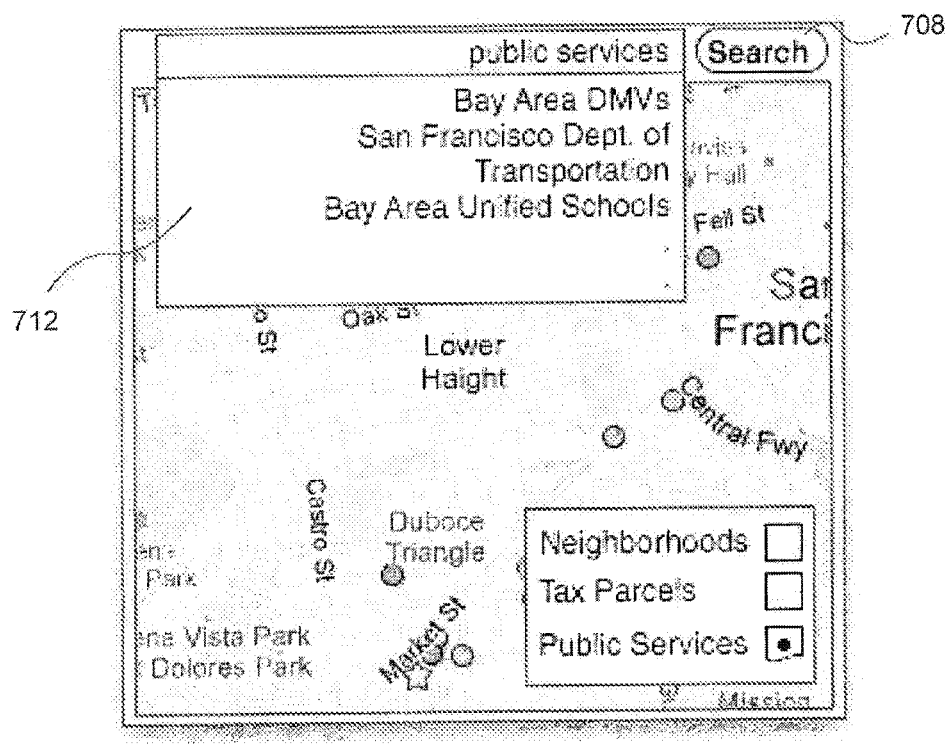
Figure 7E:
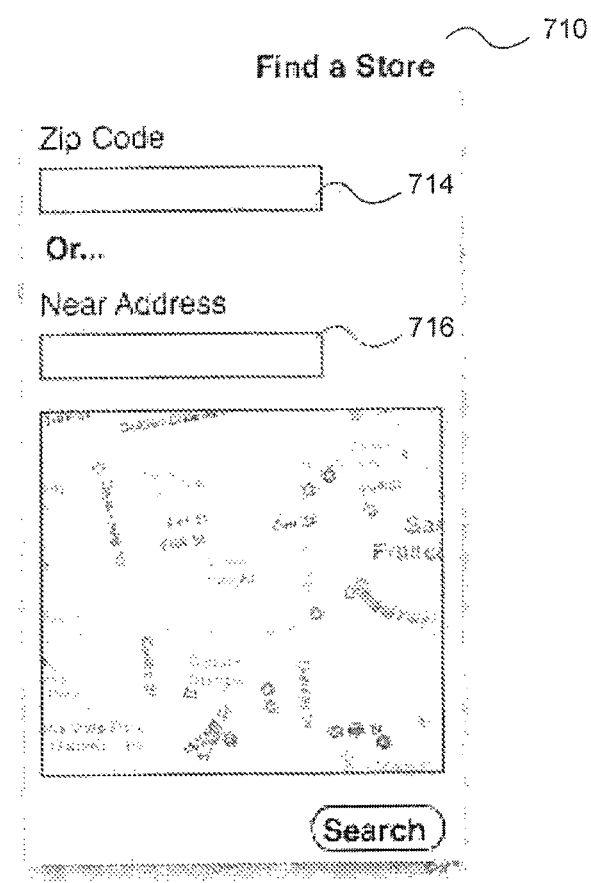

FIGS. 7B and 7C illustrate the gadget interface 702 instantiated on different computing devices such as a smart-phone and tablet computer respectively. FIG. 7D illustrates an exemplary menu 712 that appears when a user begins to type in a search string (e.g., "public services") in search box 708. FIG. 7E illustrates an exemplary gadget 710 that can be used to display a map associated with a zip code using zip code input box 714 or a map near an address provided by a user in address box 716.

In an embodiment, processing system 140 may group each of the one or more translated GIS datasets into a translated asset. Furthermore, for example, a map may include data from different. GIS datasets. In an embodiment, these different GIS datasets may be grouped together as a translated asset representing the map. Processing system 140 may track a translated asset, and maintain the translated asset as a single entity representing the map. In this way, by maintaining the translated asset as a single entity, a plurality of GIS datasets may continue to represent the map, regardless of operations performed on the map at one or more of user clients 160A-N. In an embodiment, processing system 140 receives one or more GIS datasets and corresponding map files. Processing system 140 may translate each of the GIS datasets and map files into a platform-independent format, and group the translated files together as a translated asset. In a non-limiting embodiment, a map layer may include one or more map assets and a map project may include one or more map layers.

Processing system 140 may provide one or more translated GIS datasets and assets to serving system 150. Serving system 150 may then publish a map including one or more translated GIS datasets. The published map may be a 2D or 3D representation at clients 160A-N. Serving system 150 may access information stored on serving repository 182. Serving repository 182 may be any storage device that stores data needed by serving system 150 to perform data retrieval, map publishing, and forwarding of maps and translated GIS datasets to the client platforms 160A-N.

In an embodiment, serving system 150 may collect analytical information associated with the viewing of a published map at clients 160A-N. For example, serving system 150 may collect analytics such as total page views for a published map, a "heat-map" identifying frequently accessed areas of a published map, which features of a published map are accessed, and which features of a published map users are currently interested in accessing. In an embodiment, such analytical information may be presented to a map builder at map builder client 110.

Client platforms 160A-N, map builder client 110, processing system 140 and serving system 150 can each be any type of processing (or computing) device having one or more processors. For example, these device(s) may be a workstation, mobile device (such as a mobile phone tablet or laptop), computer, cluster of computers, set-top box, embedded system, console, or other device having at least one processor. Such a processing device may include software, firmware, hardware, or a combination thereof. Software may include one or more applications and an operating system. Hardware can include, but is not limited to, a processor, memory and graphical user interface display.

In an embodiment, both processing system 140 and/or serving system 150 may be implemented across a plurality of computers. Also, in an embodiment, all processing tasks performed and/or requested by processing system 140, serving system 150, client platforms 160A-N and map builder client 110 may be distributed across a plurality of computers. In this way, embodiments may employ a cloud computing architecture to process, store and provide map data for display.

Embodiments may display maps that are styled based on one or more platform independent style sheets. In an embodiment, a map style sheet may include one or more style rules. Style rules may, for example, define the appearance and behavior of any feature or user interface element that appears on a displayed map. For example, a style sheet rule may specify the color of a set of map features that are displayed at a particular zoom level. Style sheets may also be used to define pop-up window contents when a user clicks on or hovers over a map feature or element. In an embodiment, one or more map style sheets may be applied to map vector data (e.g., points, lines, and polygons) to obtain a styled map layer.

An embodiment for dynamic styling of platform independent map data may include receiving a request for an area of interest at a level of detail (LOD), and performing a spatial search on a dataset associated with the area of interest. As a non-limiting example, a request for an area of interest at a LOD may be received when a user selects a region on a map or when the user zooms into or out of the map. The spatial search may return features from the dataset to be displayed at the LOD associated with the area of interest. The method also includes applying one or more style rules to the features, where the style rules are device and rendering platform independent, and providing stylized features together with the area of interest for display. In an embodiment, the obtaining, the applying and the providing may be performed "on-the-fly" and in response to the user's request for the area of interest. Map style sheets are further described in U.S. Patent Application No. 61/445,868, entitled "Style Sheets For Dynamic Styling Of Platform Independent Map Data," which is incorporated by reference herein in its entirety.

In an embodiment, a map published and being displayed at clients 160A-N may be updated at any time using map builder client 110 and user interface 130. For example, the visualization style of a map and its features may be changed by a map builder at anytime using map builder client 110. For example, a map builder may be able to update a style sheet stored at processing system 140 using map builder client 110. Once the style sheet is updated, a corresponding map published and being displayed at clients 160A-N may be updated on-the-fly and responsive to the update. In another example, an access control list associated with a published map may be changed to control access or viewing of the published map at clients 160A-N. Furthermore, additional metadata may be associated with the published map as it is being viewed by a user at one or more of clients 160A-N. A published map may also be updated by adding, deleting and/or modifying the individual datasets that are associated with the published map.

In an embodiment, any user viewing a published map at clients 160A-N may not experience any viewing or editing interruption while the published map is being updated by a map builder using user interface 130. In another embodiment, while the published map is being updated by the map builder, the user may continue to view the existing version of the published map. Later, upon subsequent access to the published map, the user may view the most current version or updated version of the published map.

Figure 2A:
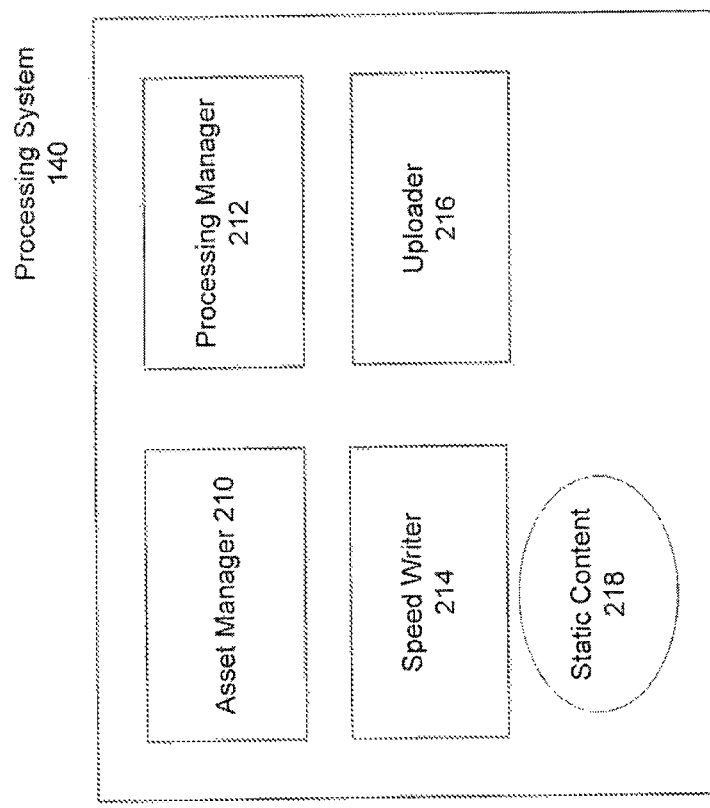
FIG. 2A is a diagram of a processing system, according to an embodiment.

FIG. 2A is a diagram of processing system 140 in greater detail, according to an embodiment. As illustrated in FIG. 2A, processing system 140 may include asset manager 210, processing manager 212, speed writer 214, and uploader 216. Processing system 140 may also include static content 218, which is accessible by any of the above-noted modules 210-216. In an embodiment, static content 218 may be used by processing system 140 to store any data needed during operation of processing system 140.

In an embodiment, asset manager 210 may store a record of data and data pointers associated with processing system 140 and serving system 150. Asset manager 210 may track map assets and metadata associated with GIS datasets using the stored record.

In an embodiment, speed writer 214 receives a queue of memory write instructions from asset manager 210. Speed writer 214 may write data referenced in the queue to storage (e.g., processing repository 182). In a non-limiting embodiment, speed writer 214 may store map metadata in a first memory (not shown), and the map data may be stored in a second memory (not shown) that is separate from the first memory. The first memory may be faster (or low latency), but more transient, than the first memory. For example, the first memory may be non-persistent storage and the second memory may be persistent storage.

In this way, embodiments provide fast access to the map metadata. In a further embodiment, changes to the map metadata may be queued in a third memory (not shown) to be quickly written to the second memory. By quickly writing changes to persistent storage, embodiments may reduce the likelihood of lost data.

In an embodiment, processing manager 212 receives a request to perform an operation on a dataset from asset manager 210. Processing manager 212 may initiate modules (e.g., uploader 216) to perform the operation requested by asset manager 210 and may also track the status of the initiated modules. As the operation is being performed by the initiated modules, processing manager 212 may provide status updates to asset manager 210 based on progress of the requested operation.

As stated previously, a published map may be composed of one or more GIS datasets and a GIS dataset may include one or more map data files. In an embodiment, processing system 140 may organize the GIS datasets and produce a multi-layered map rendering. In an embodiment, uploader 216 may forward translated and rendered map data in a platform independent format from processing system 140 to serving system 150 for serving and display at clients 160A-N.

Figure 2B:
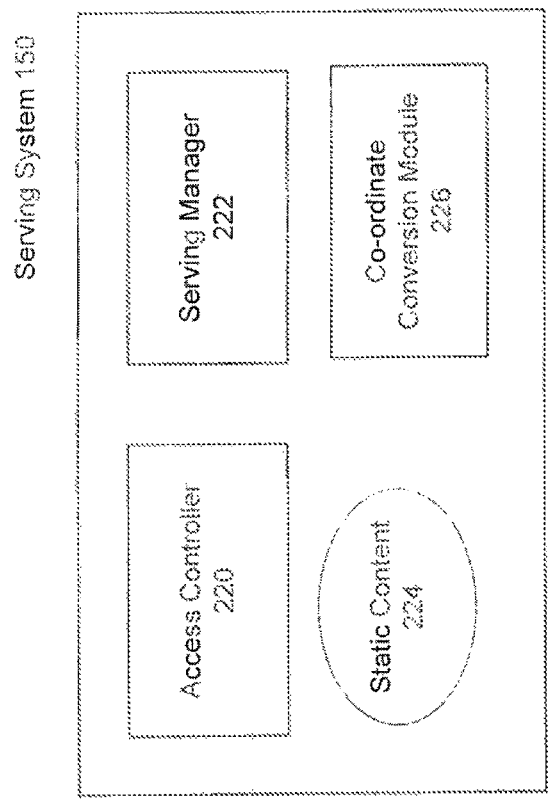
FIG. 2B is a diagram of a serving system, according to an embodiment.

FIG. 2B is a diagram of serving system 150 in greater detail, according to an embodiment. As illustrated in FIG. 2B, serving system 150 may include access controller 220, serving manager 222 and static content 224. In another embodiment, modules 210-216 of processing system 140 may also be located within serving system 150.

In an embodiment, processing system 140 may provide translated GIS datasets to client platforms 160A-N using serving system 150. In an embodiment, serving system 150 may format the translated datasets and map data for delivery to client platforms 160A-N.

In an embodiment, serving manager 222 may manage the process of serving the map to client platforms 160A-N by identifying client device address information and related delivery information. In a non-limiting embodiment, serving manager 222 may identify and add or remove any server(s) needed to serve content to client platforms 160A-N In this way, serving manager 222 may adapt to an increase or decrease in map content requests from clients 160A-N.

Access controller 220 may review an ACL to control viewing and/or serving of map data and gadgets to clients 160A-N. As discussed above, an ACL may be created by a map builder using user interface 130. An ACL may define one or more users (or clients 160A-N) that may be given access to some or all of geographic information stored and published by system 100. A user may be assigned to an ACL having a predefined level of access to view, modify and manipulate map data using client platforms 160A-N.

Static content 224 may store any information needed during operation of serving system 150. In an embodiment, serving system 150 may also include a co-ordinate conversion module 226 that may convert a map's co-ordinate and map projection prior to serving the map to clients 160A-N. For example, co-ordinate conversion module 226 may convert map data from a mercator map projection to a plate carrée projection. The mercator and plate carrée projections are map projections known to those skilled in the art. It is to be appreciated that co-ordinate conversion module 226 may be configured to work with any other co-ordinate or map projection systems, known now, or developed in the future.

Figure 3:
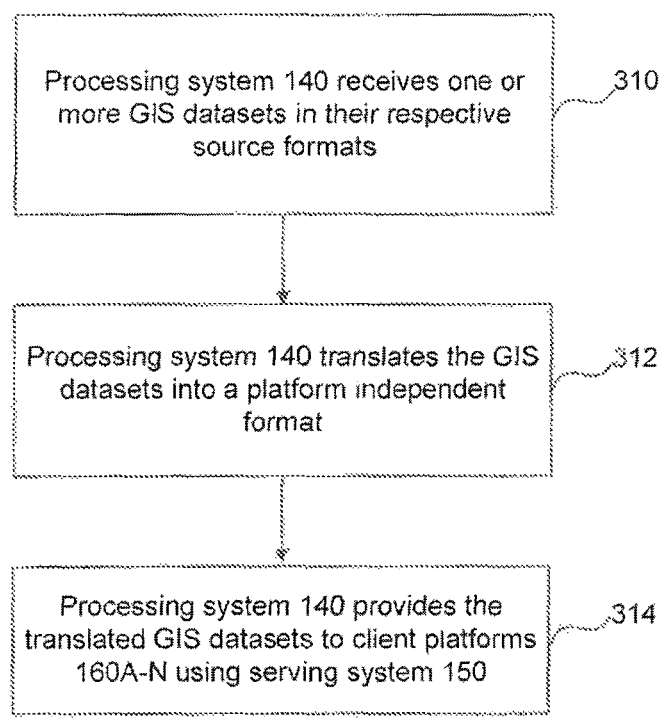
FIG. 3 is a flowchart illustrating an exemplary operation of a processing system, according to an embodiment.

FIG. 3 is a flowchart illustrating an exemplary overall operation of processing system 140, according to an embodiment.

Method 300 begins with processing system 140 receiving one or more GIS datasets in their respective source formats (step 310).

As an example, each GIS dataset received by processing system 140 may be formatted according to an underlying source format, and may include information about one or more locations (e.g., spatial data) and additional information about each location (e.g., map metadata). As an example, each GIS dataset may comprise one or more files. In one embodiment, a GIS dataset may include one file with spatial data, and one or more additional files with attribute data, such as elevation data and shape data.

Source formats for GIS datasets may include, for example and without limitation, raster formats, vector formats, and grid formats. Raster formats may describe geographical features. Implementations of raster formats for GIS datasets may include, for example and without limitation, ARC Digitized Raster Graphics (ADRG), Band Interleaved by Line, Compressed ARC Digitised Raster Graphics, Enhanced Compressed ARC Raster Graphics, Controlled Image Base, Digital raster graphic, enhanced compressed wavelet, ESRI grid, GeoTIFF, ERDAS Imagine image file format, JPEG2000, Multi-Resolution Seamless Image Database, netCDF, etc.

Vector formats may describe geographical features as points, lines, and polygons. Implementations of vector formats for GIS datasets may include, for example and without limitation, Geography Markup Language, AutoCAD DXF, Shapefile, Simple Features, MapInfo TAB format, National Transfer Format, Topologically Integrated Geographic Encoding and Referencing, Cartesian coordinate system, Vector Product Format, GeoMedia, ISFC, Personal Geodatabase, File Geodatabase, Coverage, Spatial Data File, GeoJSON, SOSI_Standard, Digital Line Graph, etc.

Grid formats for GIS datasets may include, for example and without limitation, USGS Digital Elevation Model (DEM), Digital Terrain Elevation Data (DTED), GTOPO30, SDTS, etc.

These examples are purely illustrative and are not intended to limit the embodiments. Embodiments may be configured to work with any GIS or map data format, known now, or developed in the future.

Returning to flowchart 300, processing system 140 may translate the one or more GIS datasets into a platform independent format (step 312).

Processing system 140 may provide the translated GIS datasets, in the platform independent format, to client platforms 160A-N using serving system 150 (step 314). The platform independent format may not require specific GIS compatibility and may be viewed on any client platform 160A-N. The client platforms 160A-N may include combinations of various operating systems, 2D and 3D mapping platforms, and hardware devices.

Figure 4:
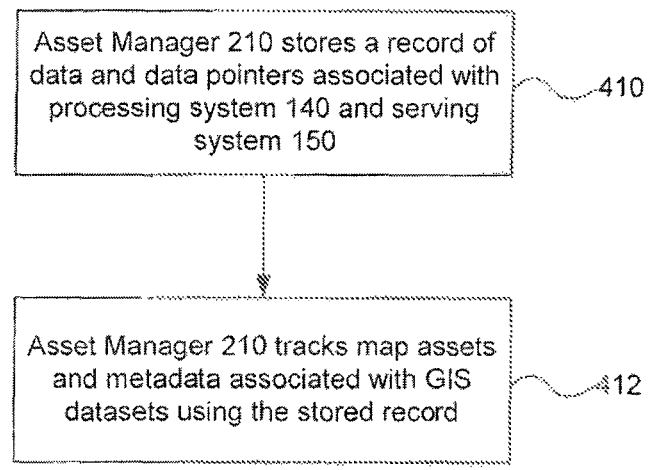
FIG. 4 is a flowchart illustrating an exemplary operation of an asset manager, according to an embodiment.

FIG. 4 is a flowchart illustrating an operation of an asset manager, according to an embodiment.

Method 400 beings with asset manager 210 storing a record of data and data pointers associated with processing system 140 and serving system 150 (step 410). As an example, the stored data may be used to retrieve, compile and create published map data, which may be provided to the client platforms 160A-N. In an embodiment, asset manager 210 may use the data pointers to locate stored data.

Asset manager 210 may track map assets and metadata associated with GIS datasets using the stored record (step 412). As discussed above, and in an embodiment, different GIS datasets may be grouped together as a translated asset representing the map. Asset manager 210 may track a translated asset, and maintain the translated asset as a single entity representing the map.

In this way, by maintaining the translated asset as a single entity, a plurality of GIS datasets continue to represent the map, regardless of operations performed on the map at one or more of user clients 160A-N.

Figure 5:
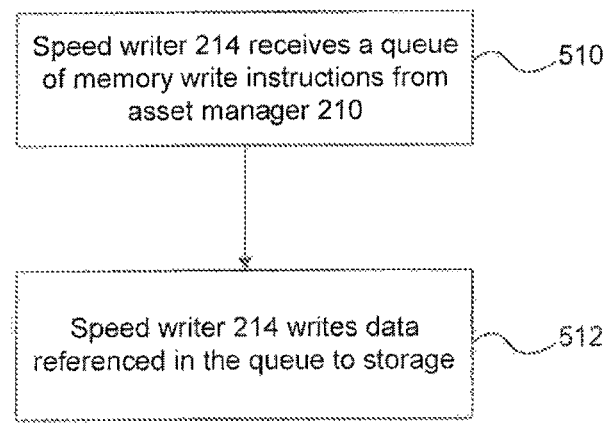
FIG. 5 is a flowchart illustrating an exemplary operation of a speed writer, according to an embodiment.

FIG. 5 is a flow chart illustrating an exemplary operation of a speed writer, according to an embodiment. Method 500 begins with speed writer 214 receiving a queue (or one or more) memory write instructions from asset manager 210 (step 510). Then, speed writer 214 may write data referenced in the queue to a storage memory (step 512). As an example, speed writer 214 may write data to processing repository 180. As discussed above, and for example, speed writer 214 may store map metadata in a first memory, and the map data may be stored in a second memory that is separate from the first memory. The first memory may be faster (or lower latency), but more transient, than the first memory. For example, the first memory may be non-persistent storage and the second memory may be persistent storage.

In this way, embodiments provide fast access to the map metadata. In a further embodiment, changes to the map metadata may be queued in a third memory to be quickly written to the second memory. By quickly writing changes to persistent storage, embodiments may reduce the likelihood of lost data.

Figure 6:
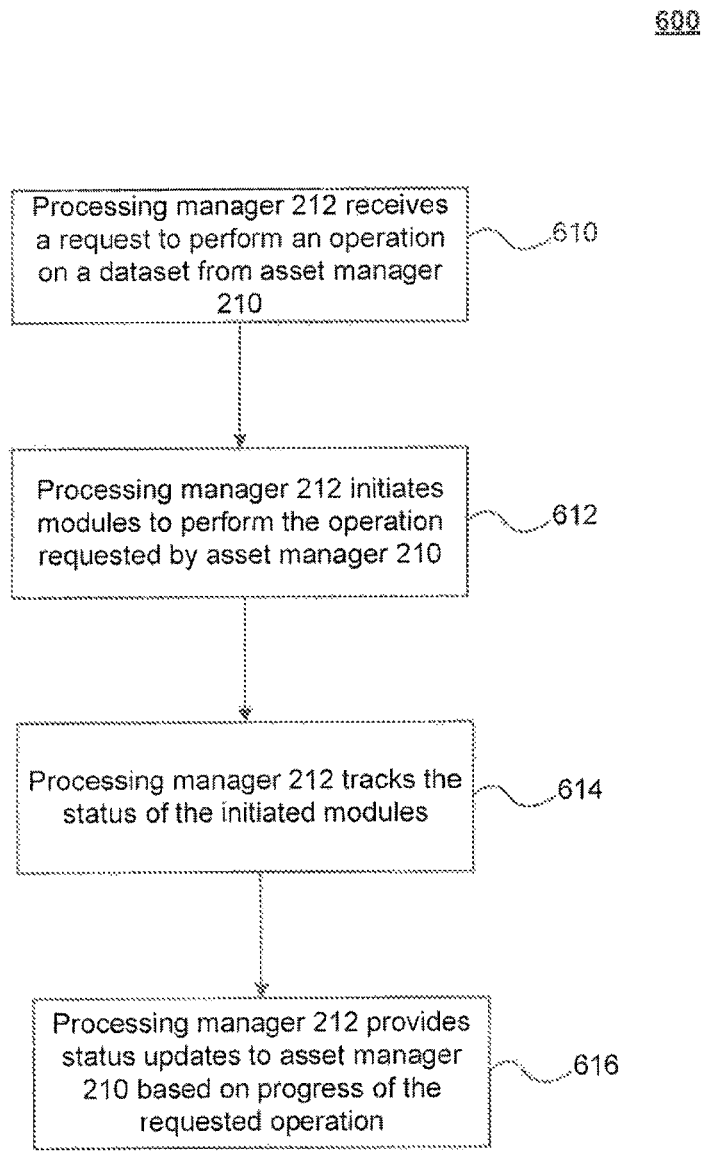
FIG. 6 is a flowchart illustrating an exemplary operation of a processing manager according to an embodiment.

FIG. 6 is a flowchart illustrating an exemplary operation of a processing manager, according to an embodiment.

Method 600 begins with processing manager 212 receiving a request to perform an operation on a dataset from asset manager 210 (step 610). As an example, the dataset may be a GIS dataset received from map builder client 110.

Processing manager 212 may initiate modules to perform an operation requested by asset manager 210 (step 612). As an example, processing manager 212 may initiate a co-coordinate conversion module to convert map coordinates or even a style module (not shown) to style map features. In an embodiment, processing manager 212 may add resources to handle larger amounts of data that may need to be processed. For example, processing manager 212 may initiate additional processing modules.

Processing manager 212 may track the status of the initiated modules (step 614). For example, processing manager 212 may track the status of the initiated modules to ensure no errors have occurred and that the operations are being performed by the modules as instructed.

Processing manager 212 provides status updates to asset manager 210 based on progress of the requested operation (step 616). In this way, asset manager 210 can track the progress of operations requested by asset manager 210.

Example Computer Embodiment

Figure 8:
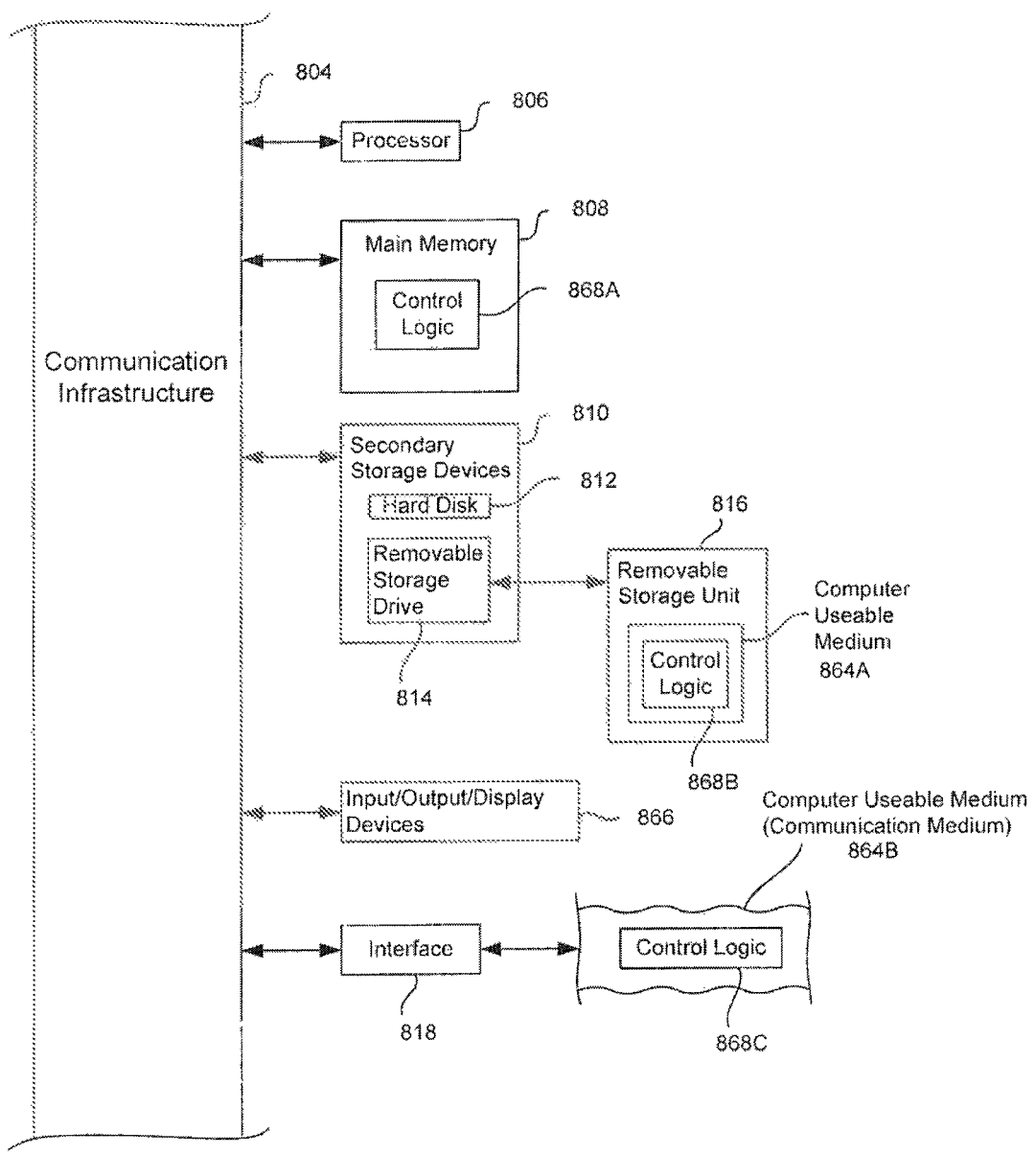
FIG. 8 illustrates an example computer useful for implementing components of the embodiments.

In an embodiment, the system and components of embodiments described herein are implemented using well known computers, such as example computer 802 shown in FIG. 8. For example, map builder client 110, processing system 140, serving system 150 and client platforms 160A-N may be implemented using computer(s) 802.

Computer 802 can be any commercially available and well known computer capable of performing the functions described herein, such as computers available from International Business Machines, Apple, Sun, HP, Dell, Compaq, Cray, etc. Computer 802 can also be any commercially available and well known tablet, mobile device or smart-phone capable of performing the functions described herein, such as devices available from Apple, HTC, RIM, Nokia, Sony, etc.

Computer 802 may include one or more processors (also called central processing units, or CPUs), such as a processor 806. Processor 806 may be connected to a communication infrastructure 804.

Computer 802 may also include a main or primary memory 808, such as random access memory (RAM). Primary memory 808 may have stored therein control logic 808A (computer software), and data.

Computer 802 may also include one or more secondary storage devices 810. Secondary storage devices 810 may include, for example, a hard disk drive 812 and/or a removable storage device or drive 814, as well as other types of storage devices, such as memory cards and memory sticks. Removable storage drive 814 represents a floppy disk drive, a magnetic tape drive, a compact disk drive, an optical storage device, tape backup, etc.

Removable storage drive 814 may interact with a removable storage unit 816. Removable storage unit 816 may include a computer useable or readable storage medium 820 having stored therein computer software 822 (control logic) and/or data. Removable storage unit 816 may represent a floppy disk, magnetic tape, compact disk, DVD, optical storage disk, or any other computer data storage device. Removable storage drive 814 may read from and/or write to removable storage unit 816 in a well known manner.

Computer 802 may also include input/output/display devices 824, such as monitors, keyboards, pointing devices, Bluetooth devices, etc.

Computer 802 may further include a communication or network interface 818. Network interface 818 may enable computer 802 to communicate with remote devices. For example, network interface 818 may allow computer 802 to communicate over communication networks or mediums 828 (representing a form of a computer useable or readable medium), such as LANs, WANs, the Internet, etc. Network interface 818 may interface with remote sites or networks via wired or wireless connections.

Control logic 826 may be communicated to and from computer 802 via communication medium 828.

Any tangible apparatus or article of manufacture comprising a computer useable or readable medium having control logic (software) stored therein is referred to herein as a computer program product or program storage device. This may include, but is not limited to, computer 802, main memory 808, secondary storage devices 810. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments may be applicable to both a client and to a server or a combination of both.

The Summary and Abstract sections may set forth one or more but not all exemplary embodiments as contemplated by the inventor(s), and thus, are not intended to limit the embodiments and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments—that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for creating cross-platform maps, comprising:
 receiving geographic information system (GIS) datasets encoded in respective source formats, wherein each GIS dataset includes one or more map assets, each map asset describing a feature, characteristic, or element of a respective map;
 translating said GIS datasets into a platform independent format, wherein said platform independent format differs from said source formats;
 extracting metadata from at least a portion of said one or more map assets;
 storing said metadata for subsequent access by one or more client platforms, wherein said metadata is stored in a first low latency non-persistent memory and said map assets are stored in a second persistent storage; and
 providing said translated GIS datasets and their respective map assets in said platform independent format to one or more client platforms,
 wherein said translating, extracting, and providing are performed using one or more processors.

2. The method of claim 1, further comprising:
 identifying missing map assets and metadata that comprise a GIS dataset.

3. The method of claim 1, further comprising:
 tracking map assets that comprise a single translated GIS dataset to maintain said translated GIS dataset as a single entity.

4. The method of claim 3, wherein said metadata is stored in said first low latency non-persistent memory in order to further maintain said translated GIS dataset as a single entity.

5. The method of claim 1, further comprising:
 providing said translated GIS datasets to a serving system.

6. The method of claim 1, wherein said GIS datasets are received from one or more user clients.

7. The method of claim 1, wherein said client platforms are configured to display said map assets as two dimensional and three dimensional representations.

8. The method of claim 1, wherein the translating further comprises merging said GIS datasets into a single GIS dataset encoded in said platform independent format.

9. The method of claim 1, wherein said platform independent format is viewable on the client platforms independent of specific GIS software.

10. A computer-based system for creating cross-platform maps, comprising:
 one or more processors;
 a first module configured to receive geographic information system datasets encoded in respective source formats, wherein each GIS dataset includes one or more map assets, each map asset describing a feature, characteristic or element of a respective map;
 a second module configured to translate said GIS datasets into a platform independent format, wherein said platform independent format differs from said source formats;
 a third module configured to extract metadata from at least a portion of said one or more map assets;
 a fourth module configured to store said metadata for subsequent access by one or more client platforms, wherein said metadata is stored in a first low latency non-persistent memory and said map assets are stored in a second persistent storage; and
 a fifth module configured to provide said translated GIS datasets and their respective map assets in said platform independent format to one or more client platforms,
 wherein said first module, said second module, said third module, said forth module and said fifth module are implemented using the one or more processors.

11. The system of claim 10, further comprising:
a sixth module configured to identify missing map assets and metadata that comprise a GIS dataset.

12. The system of claim 10, further comprising:
a sixth module configured to track map assets that comprise a single translated GIS dataset to maintain said translated GIS dataset as a single entity.

13. The system of claim 12, wherein said metadata is stored in said first low latency non-persistent memory in order to further maintain said translated GIS dataset as a single entity.

14. The system of claim 10, further comprising:
a sixth module configured to provide said translated GIS datasets to a serving system.

15. The system of claim 10, wherein said GIS datasets are received from one or more user clients.

16. The system of claim 10, wherein said client platforms are configured to display said map assets as two dimensional and three dimensional representations.

17. The system of claim 10, wherein the second module is further configured to merge said GIS datasets into a single GIS dataset encoded in said platform independent format.

18. An article of manufacture including a computer-readable medium having instructions stored thereon that, when executed by a computing device, cause the computing device to perform operations comprising:
receiving geographic information system (GIS) datasets encoded in respective source formats, wherein each GIS dataset includes one or more map assets, each map asset describing a feature, characteristic, or element of a respective map;
translating said GIS datasets into a platform independent format, wherein said platform independent format differs from said source formats;
extracting metadata from at least a portion of said one or more map assets;
storing said metadata for subsequent access by one or more client platforms, wherein said metadata is stored in a first low latency non-persistent memory and said map assets are stored in a second persistent storage; and
providing said translated GIS datasets and their respective map assets in said platform independent format to one or more client platforms,
wherein said translating, extracting, and providing are performed using one or more processors.

19. The article of manufacture of claim 18, the operations further comprising:
identifying missing map assets and metadata that comprise a GIS dataset.

20. The article of manufacture of claim 19, the operations further comprising:
enabling searching of said GIS datasets using said metadata.

21. The article of manufacture of claim 18, the operations further comprising:
tracking map assets that comprise a single translated GIS dataset to maintain said translated GIS dataset as a single entity.

22. The article of manufacture of claim 21, wherein said metadata is stored in said first low latency non-persistent memory in order to further maintain said translated GIS dataset as a single entity.

23. The article of manufacture of claim 18, the operations further comprising:
providing said translated GIS datasets to a serving system.

24. The article of manufacture of claim 18, the operations further comprising:
associating one or more gadgets with said translated GIS datasets and map assets, wherein said gadgets enable interaction with said translated GIS datasets and said map assets.

25. The article of manufacture of claim 24, the operations further comprising:
controlling access to said gadgets using an access control list (ACL).

26. The article of manufacture of claim 18, the operations further comprising:
controlling access to said translated GIS datasets and said map assets using an access control list (ACL).

27. The article of manufacture of claim 18, the operations further comprising:
translating map co-ordinates of said map assets from a first format to a second format.

28. The article of manufacture of claim 18, wherein said second format is a platform independent format.

29. The article of manufacture of claim 18, wherein said GIS datasets are received from one or more user clients.

30. The article of manufacture of claim 18, wherein said client platforms are configured to display said map assets as two dimensional and three dimensional representations.

31. The article of manufacture of claim 18, wherein the translating further comprises merging said GIS datasets into a single GIS dataset encoded in said platform independent format.

* * * * *